US005753761A

United States Patent [19]
Sandstrom et al.

[11] Patent Number: 5,753,761
[45] Date of Patent: May 19, 1998

[54] METHOD OF PREPARING TRANS POLYBUTADIENE BLEND FOR USE IN TIRES

[75] Inventors: Paul Harry Sandstrom, Tallmadge; David John Zanzig, Uniontown; Nissim Calderon, Akron, all of Ohio

[73] Assignee: The Goodyear Tire & Rubber Company, Akron, Ohio

[21] Appl. No.: 775,050

[22] Filed: Dec. 27, 1996

[51] Int. Cl.$^6$ ................................ C08C 2/00; C08L 9/00
[52] U.S. Cl. .......................... 525/236; 525/197; 525/198; 525/232; 156/110.1; 152/209 R; 152/450
[58] Field of Search ........................... 525/232, 236, 525/193, 194, 197, 198; 156/110.1; 152/209 R, 450

[56] References Cited

U.S. PATENT DOCUMENTS

| | | | |
|---|---|---|---|
| 3,060,989 | 10/1962 | Railsback et al. | 525/236 X |
| 3,213,160 | 10/1965 | Crouch | 525/236 |
| 4,192,366 | 3/1980 | Scriver, Jr. et al. | 525/236 X |
| 4,310,582 | 1/1982 | Stumpe, Jr. | 525/236 X |
| 4,342,670 | 8/1982 | Ahagon et al. | 525/236 X |
| 5,174,838 | 12/1992 | Sandstrom et al. | 152/209 R |
| 5,229,459 | 7/1993 | Sandstrom et al. | 525/236 X |
| 5,580,930 | 12/1996 | Kang et al. | 525/236 X |

FOREIGN PATENT DOCUMENTS

| | | | |
|---|---|---|---|
| 61-43453 | 7/1986 | Japan | 152/209 R |

*Primary Examiner*—Fred Teskin
*Attorney, Agent, or Firm*—Henry C. Young, Jr.

[57] ABSTRACT

The present invention relates to the utilization of trans 1,4-polybutadiene resin having a melting point of at least 30° C. in rubber compositions. The invention, in one aspect, relates to replacing, or at least partially replacing, natural rubber with a pre-blend of trans 1,4-polybutadiene resin and synthetic cis 1,4-polyisoprene rubber. The invention particularly relates to preparation and utilization of a pre-blend of trans 1,4-polybutadiene resin and synthetic cis 1,4-polyisoprene rubber by blending individual polymerizate cements, drying the pre-blend, and use of such pre-blend in the preparation of rubber compositions and of manufactured products such as, for example, tires.

38 Claims, No Drawings

METHOD OF PREPARING TRANS POLYBUTADIENE BLEND FOR USE IN TIRES

FIELD

This invention relates to the utilization of a trans 1,4-polybutadiene resin having a melting point within a range of 30° C. to 50° C. in rubber compositions. In one aspect, it relates to at least partially replacing natural rubber or as a substitution for natural rubber in a rubber composition with a pre-blend composed of such a trans 1,4-polybutadiene resin and synthetic cis 1,4-polyisoprene rubber. It particularly relates to preparation and use of a pre-blend of such trans 1,4-polybutadiene resin and synthetic cis 1,4-polyisoprene rubber by blending individual polymerizate cements, drying the blend, and the use of such pre-blend in the preparation of rubber compositions and of manufactured products such as, for example, tires.

BACKGROUND

Trans 1,4-polybutadiene is sometimes used in various rubber compositions. It typically exhibits, or promotes, very good green strength for various rubber compositions. Thus, it has sometimes been found to be a good additive to various synthetic rubber compositions which often have less than desirable green strength as compared to natural rubber based rubber compositions.

Unvulcanized rubber compositions containing an appreciable amount of natural rubber (natural cis 1,4-polyisoprene rubber) typically exhibit sufficient green strength for most purposes. Thus, utilization of trans 1,4-polybutadiene resin is usually not considered necessary in such compositions insofar as promoting green strength for the unvulcanized rubber composition is concerned.

A philosophy of desiring sufficient green strength, or resistance to flow, for unvulcanized rubber compositions is believed to be well known to those having skill in such art.

It is important to appreciate that some forms of trans 1,4-polybutadiene are elastomeric in nature and some forms, usually depending somewhat upon their microstructure, actually exhibit at least one melting point and, thus, are more like a thermoplastic resin in their unvulcanized state and prior to mixing with elastomers. They are referred to herein, at least in their unvulcanized state, as a trans 1,4-polybutadiene resin.

Upon blending and upon sulfur vulcanizing with various sulfur vulcanizable elastomers, such trans 1,4-polybutadiene resins apparently become elastomeric in nature.

This invention is primarily directed to a procedure, or method, of enabling a more efficient utilization of such a trans 1,4-polybutadiene resin in the preparation of a synthetic rubber based composition and use thereof in the manufacture of products such as tires.

The use of a trans 1,4-polybutadiene polymer, in general, has previously been suggested, for example, for use in tire treads, particularly in tire base components of tire treads of cap/base construction and also, for example, in tire sidewalls. For example, see U.S. Pat. Nos. 5,174,838 and 5,386,865.

The use of a trans 1,4-polybutadiene polymer, in general, has also been suggested for use, in either relatively small amounts or as a minor component in an elastomer composition, and has previously been suggested as being useful in various sulfur curable, diene-based, elastomer compositions, particularly where green strength of uncured rubber compositions is desired.

It has hereinbefore pointed out that unvulcanized rubber compositions based upon natural rubber usually have adequate green strength for most purposes.

However, unvulcanized rubber compositions based upon various synthetic rubbers or such rubber compositions containing only a minimal amount of natural rubber, and even rubber compositions based upon synthetic cis 1,4-polyisoprene rubber, sometimes do not have adequate green strength for various purposes.

The philosophy of desirability of unvulcanized rubber compositions having adequate green strength for various purposes, as hereinbefore pointed out, which includes the building or constructing of various rubber articles or products, including tires, is believed to be well known to those having skill in such art.

Accordingly, it is sometimes desired to use the resin form of trans 1,4-polybutadiene polymer, with its melting point within a range of 30° C. to 50° C., to enhance, or promote an increase, in green strength of (i) unvulcanized synthetic rubber based rubber compositions which do not contain, or contain only a minimal amount of, natural rubber, including (ii) unvulcanized synthetic rubber compositions which might be designed to replace the use of natural rubber for various applications.

However, use of such trans 1,4-polybutadiene resin is difficult because it is typically very hard and stiff at normal unvulcanized elastomer storage temperatures in a range of about 20° C. to about 30° C. Consequently, the trans 1,4-polybutadiene resin is very difficult to mix in conventional internal rubber mixers with elastomers and/or rubber compounding ingredients. It has been observed that most internal rubber mixers will not readily mix appreciable quantities of such trans 1,4-polybutadiene resin with elastomers without risk to stopping or even damaging the mixing machine primarily because of its aforesaid stiffness and hardness unless the trans 1,4-polybutadiene resin is first preheated to a temperature well above its melting point, for example, at least 50° C., often at least 90° C., for at least about 24 hours, and sometimes for at least 72 hours, to soften it and thereby reduce its stiffness and hardness before mixing it with other elastomers.

Such problem is believed to be unique to such resin form of trans 1,4-polybutadienes having at least one melting point above 30° C. and not such a problem to trans 1,4-polybutadienes which are more elastomeric nature in their unvulcanized, stored, state, even though such trans 1,4-polybutadiene resin-type polymers apparently become somewhat elastomeric in nature when blended with other elastomers, even in an unvulcanized state.

In practice, it is considered herein that it is generally undesirable to pre-heat unvulcanized rubber, or such trans 1,4-polybutadiene resin to elevated temperatures well above 30° C. for an extended period of time since such a risk of prematurely aging the rubber is present and, also, the obvious associated cost of pre-heating the resin for the extended period of time and providing and allocating a suitable room or location for such pre-heating operation.

Accordingly, it is desirable to provide such trans 1,4-polybutadiene resin in some kind of a form which can be more easily blended with various elastomers without first requiring the trans 1,4-polybutadiene resin to be pre-heated well above 30° C. to soften it and thereby reduce its stiffness and hardness.

In the description of this invention, the terms "rubber" and "elastomer" if used herein, may be used interchangeably, unless otherwise prescribed. The terms "rubber composition", "compounded rubber" and "rubber compound", if used herein, are used interchangeably to refer to "rubber which has been blended or mixed with various ingredients and materials" and such terms are well known to those having skill in the rubber mixing or rubber compounding art.

In the description of this invention, the term "phr" if used herein, and according to conventional practice, refers to "parts of a respective material per 100 parts by weight of rubber, or elastomer" which in this invention is intended to include the aforesaid trans 1,4-polybutadiene resin.

By the term "polymerizate", "cement" or "polymerizate cement" when used herein, it is meant that "it is the product of individually polymerizing the 1,3-butadiene (to form the trans 1,4-polybutadiene resin) or the isoprene monomer (to form the synthetic cis 1,4-polyisoprene elastomer) in the presence of a catalyst initiator and in an organic solvent and stopping the actual polymerizing of the monomers but before the resulting polymer is removed from the polymerizate".

A reference to an elastomer's Tg refers to a "glass transition temperature" which can conveniently be determined by a differential scanning calorimeter at a heating rate of 10° C. per minute.

A polymer's melting point, particularly the said trans 1,4-polybutadiene resin-type unvulcanized polymer, can conveniently be determined by use of a differential scanning calorimeter at a heating rate of about 10° C. per minute. Such method of melting point determination is well known to those skilled in such art.

A preparation of a trans 1,4-polybutadiene resin and its characterization may readily be found in U.S. Pat. No. 5,089,574.

SUMMARY AND PRACTICE OF THE INVENTION

In practice, it has been discovered that utilization of an unvulcanized trans 1,4-polybutadiene resin having at least one melting point within a range of 30° C. to about 50° C. in the preparation of elastomer blends is significantly enabled by utilizing it in a form of a prepared pre-blend.

In particular and in accordance with this invention, a method of preparing an elastomer composition is provided which comprises the steps of (A) blending (i) a polymerizate cement of trans 1,4-polybutadiene resin having at least one melting point within a range of about 30° C. to about 50° C. with (ii) a polymerizate cement of synthetic cis 1,4-polyisoprene elastomer having a cis 1,4-content of at least 90 percent followed by (B) drying and recovering said blend; wherein the weight ratio of trans 1,4-polybutadiene to cis 1,4-polyisoprene rubber in said blend is in a range of about 25/75 to about 75/25, alternatively in a range of about 30/70 to about 70/30.

Therefore, it is to be appreciated that such trans 1,4-polybutadiene resin/elastomer blend is required to contain at least 25, and alternatively at least 30, weight percent synthetic cis 1,4-polyisoprene.

It is to be appreciated that, for the practice of this invention, synthetic cis 1,4-polyisoprene rubber is differentiated from natural cis 1,4-polyisoprene rubber. In one aspect, as already hereinbefore noted, natural rubber is considered to be, among other things, more beneficial in a rubber composition for promoting green strength whereas the synthetic cis 1,4-polyisoprene elastomer is considerably less desirable for such purpose.

For the purposes of this invention, the term "synthetic cis 1,4-polyisoprene elastomer" refers to such an elastomer having a cis 1,4-content of at least 90 percent and preferably at least 95 percent.

In practice, the said trans 1,4-polybutadiene resin preferably has a microstructure characterized by having a trans 1,4- content of about 80 to about 90 percent, a vinyl 1,2-content of about 10 to about 15 percent and a cis 1,4- content of about 1 to about 5 percent.

Preferably, the said trans 1,4-polybutadiene resin is further characterized by having a molecular weight number average (Mn) in a range of about 150,000 to about 210,000.

Such trans 1,4-polybutadiene resin preferably has a heterogeneity index (HI) in a range of about 2 to about 2.5 which is representative of a relatively narrow heterogeneity index (a ratio of its molecular weight number average (Mn) to its molecular weight average (Mw). A narrow heterogeneity index is often desirable for various purposes.

Preferably the said trans 1,4-polybutadiene resin has a melting point in a range of about 38° C. to about 42° C.

Typically, the said trans 1,4-polybutadiene has a Tg within a range of about –70° C. to about –80° C.

While all aspects of the invention may not be fully understood, it is believed that the aforesaid microstructure of the trans 1,4-polybutadiene resin contributes substantially to its thermoplastic resin type of properties, particularly its rather hard and stiff appearance property at temperatures below about 30° C., such as about 20° C. to about 25° C., and its melting point property within a temperature range of about 30° C. to about 50° C.

It is also considered that its characterized molecular weight average (Mn) range as well as its relatively narrow heterogeneity index may contribute somewhat to its aforesaid resin-like property prior to mixing it with other elastomers.

It is to be appreciated that the mixture of the trans 1,4-polybutadiene resin with the synthetic cis 1,4-polyisoprene elastomer prepared according to this invention may sometimes be referred herein to as being an elastomer composition or a rubber composition.

In further practice of this invention, a method of preparing 100 parts by weight of a rubber composition is provided which comprises (a) preparing an elastomer composition pre-blend by the steps of blending (i) a polymerizate cement of the said trans 1,4-polybutadiene resin having at least one melting point within a range of about 30° C. to about 50° C. with (ii) a polymerizate cement of synthetic cis 1,4-polyisoprene elastomer followed by (b) drying and recovering said pre-blend; wherein the weight ratio of trans 1,4-polybutadiene to cis 1,4-polyisoprene rubber is in a range of about 25/75 to about 75/25 in said pre-blend, and (c) mixing about 25 to about 75 parts by weight of said elastomer composition pre-blend with about 75 to about 25 parts by weight of at least one additional diene-based elastomer in an internal mixer.

It is significant that it is considered herein that the practice of this invention enables the said trans 1,4-polybutadiene resin, in a form of the aforesaid especially prepared pre-blend, to be introduced into an internal mixer at a temperature of the pre-blend in a range of about 20° C. to about 30° C.

It is to be appreciated that internal mixers for rubber compositions are well known to those skilled in the rubber mixing art and are differentiated from open mill type rubber mixers.

It is important to appreciate that the pre-blend prepared according to the method of this invention as well as the method of utilizing such pre-blend to prepare mixtures thereof with other elastomers is considered herein to produce novel rubber, or elastomer, compositions in that it is considered that the polymerizate blending creates a more homogeneous mixture of the said trans 1,4-polybutadiene and the synthetic cis 1,4-polyisoprene elastomer than conventional mixing such materials in a conventional internal mixer, without using extreme measures. Indeed, it is considered herein that use of the pre-blend prepared according to this invention results in novel and inventive rubber compositions and manufactured articles, such as tires.

Accordingly, and in another aspect of this invention, a process of preparing a tire, and the resulting tire, is provided which comprises preparing a rubber composition by mixing the said especially prepared pre-blend with at least one another elastomer, forming the prepared rubber composition as a tire component and building a tire with said component as a part thereof.

In the description, the term such as "mixing with another elastomer" is used in a context of mixing an elastomer other than the aforesaid elastomer pre-blend prepared by the method of this invention. For example, such other elastomer might be a synthetic cis 1,4-polyisoprene rubber which, insofar as the description of this invention is concerned, is an individual elastomer other than the especially prepared pre-blend itself of the trans 1,4-polybutadiene and the synthetic cis 1,4-polyisoprene rubber.

The forming of a tire component is contemplated to be by conventional means such as, for example, by extrusion of rubber composition to provide a shaped, unvulcanized rubber component such as, for example, a tire tread, and by calendering the rubber composition onto a textile fabric to form a tire reinforcement component. Such forming of tire components and the building of a tire using such components is well known to those having skill in such art.

Accordingly, it is considered herein that a tire component, and thus a tire having such a component, is novel in a sense, for example as hereinbefore discussed, that the aforesaid preparation of the required pre-blend provides an elastomer composition of greater homogeneity of its said polymeric components, namely the said pre-blend of the trans 1,4-polybutadiene and the synthetic cis 1,4-polyisoprene elastomer, than would be obtained by conventional mixing circumstance in a conventional internal mixer.

It is understood that the tire, as a manufactured article, is prepared by shaping and sulfur curing the assembly of its components at an elevated temperature (e.g. 140° C.–160° C.) and elevated pressure in a suitable mold. Such practice is well known to those having skill in such art.

Thus, in a more specific aspect of this invention, a tire is provided having a tread component, namely an outer, circumferential tread intended to be ground-contacting, comprised of a rubber composition prepared according to this invention.

In practice, it has been observed that the trans 1,4-polybutadiene resin/synthetic cis 1,4-polyisoprene rubber pre-blend prepared according to this invention can be suitably introduced at a pre-blend temperature in a range of about 20° C. to about 30° C. into an internal rubber mixer much more easily than simply introducing the trans 1,4-polybutadiene resin by itself at such temperature range.

It is considered herein that the method prescribed by this invention requiring a preparation of the pre-blend by mixing individual cements of trans 1,4-polybutadiene resin and of synthetic polyisoprene is far superior to dry mixing the two polymers together because, as hereinbefore observed, the aforesaid trans 1,4-polybutadiene resin is considered herein to be too hard and stiff to process in conventional internal mixers unless it is first pre-heated to a polymer temperature significantly above a major melting point of the trans 1,4-polybutadiene resin and usually at least 50° C. in a hot house (a heated room) for an extended period of time.

It is important to appreciate, as hereinbefore pointed out, that the trans 1,4-polybutadiene resin/synthetic cis 1,4-polyisoprene pre-blend of this invention is advantageous because it enables the trans 1,4-polybutadiene resin to be mixed, particularly in an internal mixer, much more easily with other elastomers for a preparation of elastomer compositions. This is because the pre-blend is significantly softer at 20° C. to 30° C. and can, therefore, be more easily blended with other elastomers and other rubber compounding ingredients.

A significant aspect of this invention is the creation of the required pre-blend by blending the individual polymerizates of the polymers in a solvent-based state instead of by dry mixing the polymers which would require pre-heating the trans 1,4-polybutadiene resin prior to mixing it with the synthetic cis 1,4-polyisoprene elastomer in an internal mixer.

In practice, the organic solvent based polymerizate of trans 1,4-polybutadiene resin typically has a concentration of about 10 to about 25 weight percent of the trans 1,4-polybutadiene resin therein and the organic solvent based polymerizate of synthetic cis 1,4-polyisoprene elastomer typically has a concentration of about 17 to about 25 weight percent of the cis 1,4-polyisoprene elastomer therein.

The creation of rubber blends, and rubber products thereof, using the pre-blend of this invention is considered herein to be novel and particularly beneficial because the improved processability of the trans 1,4-polybutadiene resin enables it to be used without first pre-heating the trans 1,4-polybutadiene resin to the elevated temperature before it can be easily used to blend with various elastomers in an internal mixer.

The aforesaid additional diene based elastomers which may be added to the aforesaid pre-blend are, conventionally and for example, homopolymers of 1,3-butadiene or isoprene, copolymers of conjugated dienes such as 1,3-butadiene and isoprene and copolymers of conjugated dienes such as 1,3-butadiene and/or isoprene with a vinyl aromatic compound such as styrene and alpha-methylstyrene, usually styrene.

Representative of such diene-based elastomers are, for example, cis 1,4-polybutadiene, natural cis 1,4-polyisoprene rubber, additional synthetic cis 1,4-polyisoprene rubber, vinyl polybutadiene rubbers particularly medium to high vinyl polybutadiene rubbers containing about 30 to about 85 percent vinyl 1,2-content, styrene/butadiene copolymers whether prepared by aqueous emulsion or organic solvent polymerization, isoprene/butadiene copolymers, styrene/isoprene copolymers and styrene/isoprene/butadiene terpolymers.

The vulcanized rubber composition should contain a sufficient amount of reinforcing filler(s) such as carbon black and, optionally silica, if silica is used, to contribute a reasonably high modulus for the uncured rubber composition and high resistance to tear for the sulfur cured rubber composition. The amount of the reinforcing carbon black, and silica if used, may be as low as about 30 parts per 100 parts rubber, but is more preferably from about 35 to about 90 parts by weight.

Representative of such carbon blacks are those, for example, having an Iodine adsorption value in a range of about 25 to about 140, alternatively about 40 to about 120, together with a DBP (dibutylphthalate) Number in a range of about 30 to about 160, alternatively about 60 to about 140. Representative of such carbon blacks can easily be found in *The Vanderbilt Rubber Handbook*, 1978 edition, page 417.

If silica is used, siliceous pigments for rubber compounding applications might be precipitated siliceous pigments (silica).

Precipitated silicas are, for example, those obtained by the acidification of a soluble silicate, e.g., sodium silicate. Such precipitated silicas are well known to those having skill in such art.

Such precipitated silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, page 304 (1930).

The silica may also be typically characterized by having a dibutylphthalate (DBP) absorption value in a range of about 100 to about 400, and more usually about 150 to about 300.

The silica is conventionally used in conjunction with a silica coupler to connect the silica with the elastomer(s) and, thus, enhance the elastomer reinforcing effect of the silica.

Such coupling agents may, for example, be premixed, or pre-reacted, with the silica particles or added to the rubber mix during the rubber/silica processing, or mixing, stage. If the coupling agent and silica are added separately to the rubber mix during the rubber/silica mixing, or processing stage, it is considered that the coupling agent then combines in situ with the silica.

In particular, such coupling agents are sometimes composed of a silane which has a constituent component, or moiety, (the silane portion) capable of reacting with the silica surface and, also, a constituent component, or moiety, capable of reacting with the rubber, particularly a sulfur vulcanizable rubber which contains carbon-to-carbon double bonds, or unsaturation. In this manner, then the coupler acts as a connecting bridge between the silica and the rubber and thereby enhances the rubber reinforcement aspect of the silica.

Numerous coupling agents are taught for use in combining silica and rubber such as, for example, silane coupling agents containing a polysulfide component, or structure, such as bis-(3-triethoxysilylpropyl)tetrasulfide.

It is readily understood by those having skill in the art that the rubber composition would be compounded by methods generally known in the rubber compounding art, such as mixing the various sulfur-vulcanizable constituent rubbers with various commonly used additive materials such as, for example, curing aids such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Typical amounts of reinforcing type carbon blacks(s) for this invention are hereinbefore set forth. It is to be appreciated that the silica coupler may be used in conjunction with a carbon black, namely, pre-mixed with a carbon black prior to addition to the rubber composition, and such carbon black is to be included in the aforesaid amount of carbon black for the rubber composition formulation. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, naphthenic, and/or paraffinic processing oils. Typical amounts of antioxidants comprise about 1 to about 5 phr. Representative antioxidants may be, for example, diphenyl-p-phenylenediamine and others such as, for example, those disclosed in *The Vanderbilt Rubber Handbook* (1978), pages 344–346. Typical amounts of antiozonants comprise about 1 to 5 phr. Typical amounts of fatty acids, if used which can include stearic acid, comprise about 0.5 to about 3 phr. Typical amounts of zinc oxide comprise about 1 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr, with a range of from about 1.5 to about 2.5, sometimes from about 2 to about 2.5, being preferred.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 1.5, phr. In another embodiment, combinations of a primary and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The presence and relative amounts of the above additives are not considered to be an aspect of the present invention which is more primarily directed to the preparation and utilization of a pre-blend of trans 1,4-polybutadiene resin and synthetic, cis 1,4-polyisoprene rubber for the preparation of a more extended blend with the same and/or additional elastomers and particularly for use in rubber products such as tire components.

The mixing of the rubber composition can be accomplished by methods known to those having skill in the rubber mixing art. For example, the ingredients are typically mixed in at least two stages, namely, at least one non-productive stage followed by a productive mix stage. The final curatives are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art.

The rubber composition of this invention can be used for various purposes. For example, it can be used for various tire compounds. Such tires can be built, shaped, molded and cured by various methods which are known and will be readily apparent to those having skill in such art.

The invention may be better understood by reference to the following examples in which the parts and percentages are by weight unless otherwise indicated.

EXAMPLE I

In this example, pre-blends of trans 1,4-polybutadiene polymer, or resin, having at least one melting point above 30° C. and synthetic cis 1,4-polyisoprene rubber is prepared and identified herein as pre-blends A, B and C.

A polymerization cement, or polymerizate, of trans 1,4-polybutadiene resin is prepared by polymerizing 1,3-butadiene in the presence of a cobalt catalyst in a hexane solution. The polymerization is stopped by rosin acid addition, thereby creating the resulting polymerizate or polymerization cement. The polymerization cement is composed of, primarily, about 15 weight percent trans 1,4-polybutadiene resin and about 82 weight percent of hexane, as well as a very small amount of catalyst residue.

A polymerization cement (or polymerizate) of synthetic cis 1,4-polyisoprene rubber is prepared by polymerizing isoprene in the presence of a titanium catalyst in a hexane solvent. The polymerization is stopped by amine addition, thereby creating the resulting polymerizate, or polymerization cement. The polymerization cement is composed of, basically, about 22 weight percent cis 1,4-polyisoprene and about 78 weight percent of hexane as well as a small amount of catalyst residue.

The trans 1,4-polybutadiene resin and cis 1,4-polyisoprene rubber polymerizates are blended together, in various ratios, by mixing in a mixer at a temperature of about 20° C. to 30° C.

The pre-blends of trans 1,4-polybutadiene resin and synthetic cis 1,4-polyisoprene are then recovered from the blended cement mixtures by simply air drying at about 23° C. to about 25° C.

The pre-blends A, B and C of trans 1,4-polybutadiene resin and synthetic cis 1,4-polyisoprene rubber cements are shown in the following Table 1 on a dry weight basis.

TABLE 1

| Pre-Blend | A | B | C |
|---|---|---|---|
| Trans 1,4-polybutadiene[1] | 25 | 50 | 66 |

TABLE 1-continued

| Pre-Blend | A | B | C |
|---|---|---|---|
| Synthetic cis 1,4-polyisoprene[2] | 75 | 50 | 34 |

[1]Trans 1,4-polybutadiene resin having a melting point of 40° C., a Tg of about −75° C., a trans 1,4-content of about 85 percent, a vinyl 1,2- content of about 13 percent and a cis 1,4- content of about 2 percent. The trans 1,4-polybutadiene resin had a number average molecular weight (Mn) of about 180,000 as measured by gel permeation chromatography (GPC), a technique well known to those skilled in such art, and had a heterogeneity index (HI) of about 2.2.
[2]Synthetic cis 1,4-polyisoprene obtained as Natsyn® 2200 from The Goodyear Tire & Rubber Company having a cis 1,4-content of at least 96 percent.

EXAMPLE II

In this example, rubber compositions are prepared by blending the pre-blends of Example I with various elastomers. The blends for this Example included a Control, as well as experimental blends X, Y and Z, which are shown in the following Table 2. The blends X, Y and Z utilize the corresponding A, B and C pre-blends of Table 1 of Example I, thus with blend X using pre-blend A, etc. A control blend using trans 1,4-polybutadiene resin alone instead of as a pre-blend was attempted but was not able to be completed because, as a result of its hardness and stiffness, the internal mixer resisted and almost malfunctioned. It is believed herein that continuing the attempt would have resulted in damaging the mixer.

The trans 1,4-polybutadiene resin/synthetic cis 1,4-polyisoprene rubber pre-blends were not pre-heated for this Example and were introduced into the rubber mixer at a pre-blend temperature of room temperature, or at about 23° C.

The rubber compositions containing the aforesaid pre-blends shown in Table 1 are shown in Table 2 and were prepared in an internal rubber mixer using three separate stages of addition (mixing), namely, two sequential non-productive mix stages (without the sulfur and accelerator curatives) to a temperature of about 150° C. and one final productive mix stage (with sulfur and accelerator curatives) to a temperature of about 115° C.

TABLE 2

| | Control | X | Y | Z |
|---|---|---|---|---|
| 1st Non-Productive Ingredients | | | | |
| S-SBR[1] | 50 | 50 | 50 | 50 |
| Natural rubber[2] | 50 | 0 | 0 | 0 |
| Pre-Blend A | 0 | 50 | 0 | 0 |
| Pre-Blend B | 0 | 0 | 50 | 0 |
| Pre-Blend C | 0 | 0 | 0 | 50 |
| Filler[3] | 60 | 60 | 60 | 60 |
| Processing oil & waxes[4] | 9 | 9 | 9 | 9 |
| Stearic acid | 2 | 2 | 2 | 2 |
| Zinc oxide | 4 | 4 | 4 | 4 |
| Antidegradants[5] | 3.5 | 3.5 | 3.5 | 3.5 |

TABLE 2-continued

|  | Control | X | Y | Z |
|---|---|---|---|---|
| 1st Non-Productive Ingredients | | | | |
| 2nd Non-Productive | | | | |
| Bis-(3-triethoxylsilylpropyl) tetrasulfide[6] | 3.5 | 3.5 | 3.5 | 3.5 |
| Productive Ingredients | | | | |
| Sulfur | 1.5 | 1.5 | 1.5 | 1.5 |
| Accelerator, sulfenamide and thiuram type | 1 | 1 | 1 | 1 |

[1] Solution polymerization prepared styrene/butadiene copolymer elastomer obtained as Solflex® 1216 from The Goodyear Tire & Rubber Company, having a Tg of about −42° C. and a bound styrene content of about 11 percent;
[2] Natural rubber (cis 1,4-polyisoprene rubber);
[3] Blend of N299 carbon black and silica as HiSil 210 from PPG Industries in a 2.5/1 weight ratio;
[4] Paraffinic rubber processing oil and microcrystalline and paraffinic waxes;
[5] Phenylenediamine type;
[6] A composite commercially available from Degussa GmbH as X50S in a form of a 50/50 blend of bis-(3-triethoxysilylpropyl) tetrasulfide (said tetrasulfide also available from Degussa GmbH as Si69), with carbon black and, thus, the tetrasulfide is considered as being 50% of the composite reported in Table 2.

The following Table 3 illustrates the various physical properties of the cured rubber compositions. The rubber compositions had been cured at 150° C. for about 18 minutes.

TABLE 3

| Sample | Control | X | Y | Z |
|---|---|---|---|---|
| MPT Appearance[1] | smooth | smooth | smooth | rough |
| Green Strength, MPa (120%) | 0.57 | 1.42 | 1.82 | 1.67 |
| Rheometer Data (150° C.) | | | | |
| ML (dNm) | 8.9 | 9.1 | 10.4 | 10.6 |
| MH (dNm) | 37.5 | 42.3 | 44.2 | 43.8 |
| $T_1$ (min) | 5.5 | 6.0 | 7.2 | 7.1 |
| $T_{25}$ (mins) | 7.9 | 9.4 | 12.1 | 12.7 |
| $T_{90}$ (mins) | 16.7 | 22.0 | 29.0 | 33.5 |
| Stress-Strain | | | | |
| Tensile Strength, MPa | 17.4 | 17.4 | 17.1 | 16.7 |
| Elongation at Break, % | 498 | 482 | 474 | 506 |
| 100% Modulus, MPa | 2.1 | 2.6 | 2.6 | 2.4 |
| 300% Modulus, MPa | 10.2 | 11.0 | 10.9 | 9.8 |
| Rebound | | | | |
| Rebound at 23° C. (%) | 44.1 | 43.4 | 44.1 | 42.2 |
| Rebound at 100° C. (%) | 59.5 | 58.6 | 58.8 | 56.7 |
| Hardness | | | | |
| Shore A | 61 | 67 | 67 | 67 |
| Hardness, 23° C. Shore A | 57 | 63 | 62 | 62 |
| Hardness, 100° C. | | | | |
| Rheovibron | | | | |
| E @ 60° C., (MPa) | 1.3 | 1.7 | 1.7 | 1.6 |
| Tan. Delta @ 60° C. | 0.098 | 0.089 | 0.091 | 0.097 |
| DIN Abrasion, volume loss (cm³) | 102 | 85 | 77 | 74 |

[1] Extrudate appearance (Monsanto commercially available processability Tester).

The physical properties of the samples in this Example show that the prepared pre-blend of trans 1,4-polybutadiene resin and synthetic cis 1,4-polyisoprene rubber, via blending and recovering from corresponding polymerizates, can be used in place of natural rubber to prepare an elastomer composition with substantially improved green strength and without sacrificing the elastomer blends' processability. This is evidenced, for example, by the appearance of the extrudate from the Monsanto Tester.

In particular, the Monsanto processability test (MPT, using the Monsanto Tester), of the elastomer compositions X and Y, using pre-blends A and B were comparable to the Control which showed a smooth extrudate appearance. The rubber composition Z, using pre-blend C, showed a comparatively rough appearance, thereby demonstrating that a relatively maximum content, of trans 1,4-polybutadiene in the pre-blend composition utilized had been approached.

The green strength of the elastomer compositions X, Y and Z, using pre-blends A, B and C, was actually improved, compared to the Control, as evidenced by the higher MPa values at 120% elongation for the green strength values.

The Example further shows that the elastomer compositions X, Y and Z, using pre-blends A, B and C, as compared to the Control, showed an improvement in DIN abrasion resistance in which a lower volume loss represents greater abrasion resistance which may be somewhat predictive of improvement (reduction) in tire treadwear for a tread composed of such compositions.

The results also show comparable modulus and hysteresis values which are predictive of suitable handling and rolling resistance properties for a tire with a tread of such composition(s).

While certain representative embodiments and details have been shown for the purpose of illustrating the invention, it will be apparent to those skilled in this art that various changes and modifications may be made therein without departing from the spirit or scope of the invention.

What is claimed is:

1. A method of preparing an elastomer composition which comprises the steps of (A) blending (i) a polymerizate cement of trans 1,4-polybutadiene resin having at least one melting point within a range of about 30° C. to about 50° C. with (ii) a polymerizate cement of synthetic cis 1,4-polyisoprene elastomer having a cis 1,4-content of at least 90 percent followed by (B) drying and recovering said blend; wherein the weight ratio of trans 1,4-polybutadiene resin to cis 1,4-polyisoprene rubber in said blend is in a range of about 25/75 to about 75/25.

2. The method of claim 1 wherein said trans 1,4-polybutadiene resin has a microstructure characterized by having a trans 1,4- content of about 80 to about 90 percent, a vinyl 1,2- content of about 10 to about 15 percent and a cis 1,4- content of about 1 to about 5 percent.

3. The method of claim 2 wherein said trans 1,4-polybutadiene resin has a melting point of about 38° C. to about 42° C.

4. The method of claim 2 wherein said trans 1,4-polybutadiene resin has a molecular weight number average (Mn) of about 150,000 to about 210,000.

5. The method of claim 3 wherein said trans 1,4-polybutadiene resin has a molecular weight number (Mn) of about 150,000 to about 210,000.

6. A method of preparing 100 parts by weight of a rubber composition which comprises (a) preparing an elastomer composition pre-blend by the steps of blending (i) a polymerizate cement of trans 1,4-polybutadiene resin having at least one melting point within a range of about 30° C. to about 50° C. with (ii) a polymerizate cement of synthetic cis 1,4-polyisoprene elastomer followed by (b) drying and recovering said pre-blend; wherein the weight ratio of trans 1,4-polybutadiene resin to cis 1,4-polyisoprene rubber is in a range of about 25/75 to about 75/25 in said pre-blend, and (c) mixing about 25 to about 75 parts by weight of said elastomer composition pre-blend with about 75 to about 25 parts by weight of at least one additional diene-based elastomer in an internal mixer.

7. The method of claim 6 wherein said elastomer composition pre-blend is introduced into said internal mixer at a temperature of said pre-blend in a range of about 20° C. to about 30° C.

8. The method of claim 6 wherein said trans 1,4-polybutadiene resin has a microstructure characterized by having a trans 1,4-content of about 80 to about 90 percent, a vinyl 1,2-content of about 10 to about 15 percent and a cis 1,4-content of about 1 to about 5 percent.

9. The method of claim 8 wherein said trans 1,4-polybutadiene resin has a melting point of about 38° C. to about 42° C.

10. The method of claim 8 wherein said trans 1,4-polybutadiene resin has a molecular weight number average (Mn) of about 150,000 to about 210,000.

11. The method of claim 9 wherein said trans 1,4-polybutadiene resin has a molecular weight number (Mn) of about 150,000 to about 210,000.

12. The method of claim 6 wherein the said additional diene-based elastomer is selected from at least one of cis 1,4-polybutadiene rubber, cis 1,4-polyisoprene rubber (natural and/or synthetic), copolymers of conjugated dienes selected from 1,3-butadiene and isoprene and copolymers of conjugated dienes selected from 1,3-butadiene and isoprene with a vinyl aromatic compound selected from styrene and alpha-methylstyrene.

13. The method of claim 8 wherein the said additional diene-based elastomer is selected from at least one of cis 1,4-polybutadiene rubber, cis 1,4-polyisoprene rubber (natural and/or synthetic), copolymers of conjugated dienes selected from 1,3-butadiene and isoprene and copolymers of conjugated dienes selected from 1,3-butadiene and isoprene with a vinyl aromatic compound selected from styrene and alpha-methylstyrene.

14. The method of claim 9 wherein the said additional diene-based elastomer is selected from at least one of cis 1,4-polybutadiene rubber, cis 1,4-polyisoprene rubber (natural and/or synthetic), copolymers of conjugated dienes selected from 1,3-butadiene and isoprene and copolymers of conjugated dienes selected from 1,3-butadiene and isoprene with a vinyl aromatic compound selected from styrene and alpha-methylstyrene.

15. The method of claim 10 wherein the said additional diene-based elastomer is selected from at least one of cis 1,4-polybutadiene rubber, cis 1,4-polyisoprene rubber (natural and/or synthetic), copolymers of conjugated dienes selected from 1,3-butadiene and isoprene and copolymers of conjugated dienes selected from 1,3-butadiene and isoprene with a vinyl aromatic compound selected from styrene and alpha-methylstyrene.

16. The method of claim 11 wherein the said additional diene-based elastomer is selected from at least one of cis 1,4-polybutadiene rubber, cis 1,4-polyisoprene rubber (natural and/or synthetic), copolymers of conjugated dienes selected from 1,3-butadiene and isoprene and copolymers of conjugated dienes selected from 1,3-butadiene and isoprene with a vinyl aromatic compound selected from styrene and alpha-methylstyrene.

17. A process of preparing a tire which comprises preparing a rubber composition according to claim 1, forming said prepared rubber composition as a tire component and building a tire with said component as a part thereof.

18. A process of preparing a tire which comprises preparing a rubber composition according to claim 6, forming said prepared rubber composition as a tire component and building a tire with said component as a part thereof.

19. A process of preparing a tire which comprises preparing a rubber composition according to claim 7, forming said prepared rubber composition as a tire component and building a tire with said component as a part thereof.

20. A process of preparing a tire which comprises preparing a rubber composition according to claim 8, forming said prepared rubber composition as a tire component and building a tire with said component as a part thereof.

21. A process of preparing a tire which comprises preparing a rubber composition according to claim 9, forming said prepared rubber composition as a tire component and building a tire with said component as a part thereof.

22. A process of preparing a tire which comprises preparing a rubber composition according to claim 10, forming said prepared rubber composition as a tire component and building a tire with said component as a part thereof.

23. A process of preparing a tire which comprises preparing a rubber composition according to claim 11, forming said prepared rubber composition as a tire component and building a tire with said component as a part thereof.

24. A process of preparing a tire which comprises preparing a rubber composition according to claim 12, forming said prepared rubber composition as a tire component and building a tire with said component as a part thereof.

25. A process of preparing a tire which comprises preparing a rubber composition according to claim 13, forming said prepared rubber composition as a tire component and building a tire with said component as a part thereof.

26. A process of preparing a tire which comprises preparing a rubber composition according to claim 14, forming said prepared rubber composition as a tire component and building a tire with said component as a part thereof.

27. A process of preparing a tire which comprises preparing a rubber composition according to claim 15, forming said prepared rubber composition as a tire component and building a tire with said component as a part thereof.

28. The process of claim 17 wherein said component is a tire tread.

29. The process of claim 18 wherein said component is a tire tread.

30. The process of claim 19 wherein said component is a tire tread.

31. The process of claim 20 wherein said component is a tire tread.

32. The process of claim 21 wherein said component is a tire tread.

33. The process of claim 22 wherein said component is a tire tread.

34. The process of claim 23 wherein said component is a tire tread.

35. The process of claim 24 wherein said component is a tire tread.

36. The process of claim 25 wherein said component is a tire tread.

37. The process of claim 26 wherein said component is a tire tread.

38. The process of claim 27 wherein said component is a tire tread.

* * * * *